Feb. 7, 1961     I. KIRSHENBAUM ET AL     2,970,892
PREPARATION OF IMPROVED ALUMINA SUPPORTED CATALYST
Filed Dec. 9, 1957
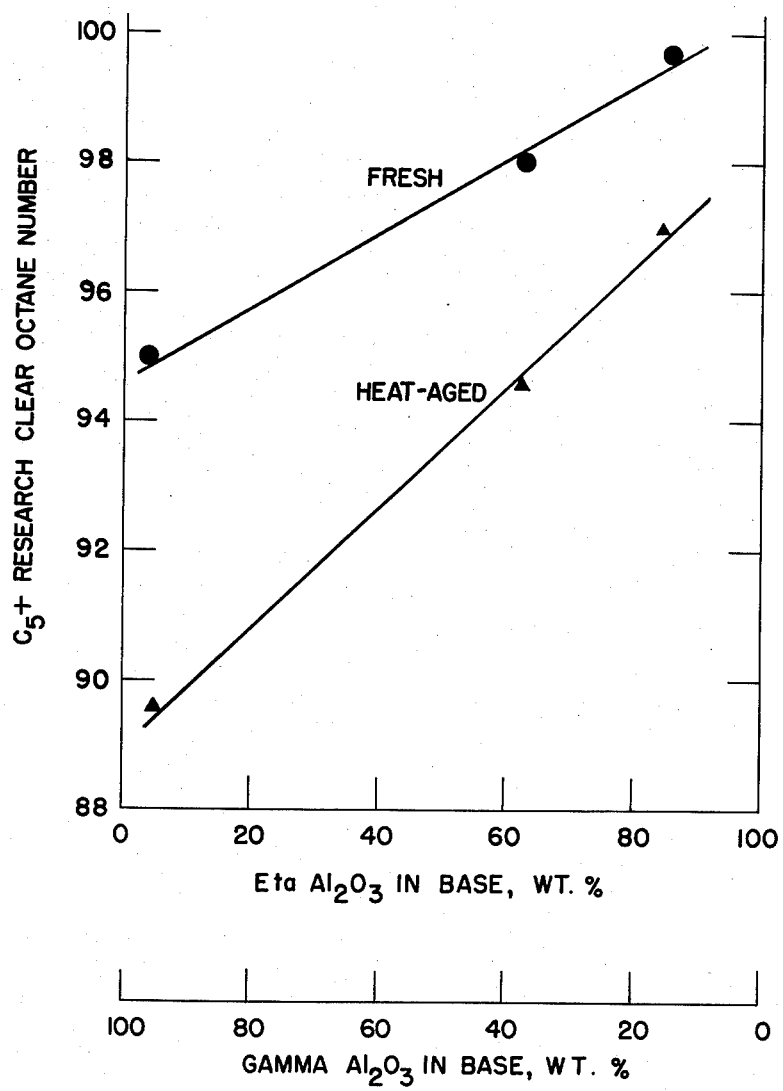
Isidor Kirshenbaum
John A. Hinlicky    Inventors
By H. M. Feyrer Attorney

United States Patent Office 2,970,892
Patented Feb. 7, 1961

2,970,892

PREPARATION OF IMPROVED ALUMINA SUPPORTED CATALYST

Isidor Kirshenbaum, Westfield, and John A. Hinlicky, Irvington, N.J., assignors to Esso Research and Engineering Company, a corporation of Delaware Filed Dec. 9, 1957, Ser. No. 701,462

4 Claims. (Cl. 23—143)

This invention relates to the preparation of improved solid catalysts for the conversion of hydrocarbon materials. More particularly, it relates to the improved preparation of eta alumina, an exceedingly effective support material for catalysts, especially platinum-containing hydroforming catalysts.

Recent developments in the petroleum refining industry have concentrated attention upon methods for the conversion of low boiling feed stocks, particularly those in the middle and heavy portions of the naphtha boiling range, into products of improved octane number. Considerable success along these lines has been obtained by the process known as hydroforming. In this process the hydrocarbon feed stock is treated at operating temperatures of about 700°–1100° F., in the presence of a catalyst of suitable activity and in a hydrogen-containing atmosphere at such pressure that the hydrocarbon transformation reactions taking place result in a net production of hydrogen. A variety of reactions are involved, which include dehydrogenation, paraffin and napththene isomerization, cyclization, or aromatization. All of these result together in producing a product of markedly improved motor fuel value as determined by octane rating.

The operating conditions of the hydroforming operation are pressures in the range of 50 to 1000 p.s.i.g., usually 100 to 700 p.s.i.g., and temperatures in the range of 700°–1100° F., usually 875°–950° F. The hydrogen dilution may vary from about 1000 to 10,000 c.f.b.

The feed or charging stock to the hydroforming reactor can be a virgin naphtha, a cracked naphtha, a Fischer-Tropsch naphtha, mixtures of these, or the like. The feed usually boils within the range of from about 150°–430° F. and may be a wide or narrow boiling cut. A preferred feed is a low sulfur or hydrofined virgin naphtha having a boiling range of 200°–350° F. The feed stock is preheated alone or in admixture with recycle gas to reaction temperature or to the maximum temperature possible while avoiding thermal degradation of the feed stock.

A particularly useful catalyst for these operations has been found to be platinum supported on an alumina base preferably derived from aluminium alcoholate. For instance, a commonly used composition of such catalyst is one containing from 0.001 to 2.0 weight percent platinum, the remainder being the alumina spacing agent or base.

A particularly suitable form of alumina for use as a support material, namely, eta alumina, has been prepared according to the following process. This process comprises reacting aluminum metal with a water-insoluble anhydrous alcohol, hydrolyzing the aluminum alcoholate, separating the hydrous alumina from the alcohol, and recovering the alumina from its aqueous slurry. The hydrolysis temperature utilized is in the range of 70°–200° F., and supplies hydrous alumina which upon calcination to anhydrous, adsorptive form is a an effective catalyst support. The adsorptive alumina produced thereby, however, has been shown to contain only about 30% eta alumina, with the remainder in the gamma form. Experiments have now demonstrated that catalyst activity and activity maintenane are improved as the eta alumina content of the support is increased. This improvement is effected without impairing the selectivity to $C_5+$ product. It is therefore desirable to obtain alumina support materials consisting predominantly, i.e., at least 80 weight percent, or essentially of eta alumina.

It has now been found that eta alumina can be formed in quantitative yields, 100% if desired, by conducting the hydrolysis of hydrocarbon solutions of the aluminum alcoholate in the presence of dilute aqueous ammonia. It is also desirable to control the total amount of water utilized, the temperature of the hydrolysis, and the time and temperature of aging, i.e. the period in which the hydrous alumina is maintained in the aqueous slurry before dehydration in order to convert the hydrous alumina predominantly to beta alumina trihydrate. By controlling in combination all these factors, the alumina of the desired pore characteristics and the aforementioned eta content can be obtained. The eta alumina can then be admixed with other catalyst components by means known to the art.

It is significant that aqueous ammonia works in the manner indicated, as conducting the hydrolysis of the aluminum alcoholate with volatile acids does not give the same result. It is also significant that the ammonia concentration is critical for the attainment of adsorptive alumina with a large proportion of pores having diameters larger than about 100 A. preferably with more than 40% of its total pore volume in macropores or pores with diameters between 0.05 and 1.0 microns.

Metallic aluminum is first reacted with an alcohol to form aluminum alcoholate. For the present process the alcohol must be essentially anhydrous. Alcohols that can be used in this process include ethyl, propyl, isopropyl, n-butyl alcohol, secondary buty alcohol, isobutyl alcohol, pentanol-1, pentanol-2, 3-methyl butanol-1, 2-methyl butanol-3, pentanol- 3, hexanol-1, hexanol-2, hexanol-3, the various methyl pentanols, the various dimethyl butanols, the various heptyl alcohols, the various octyl alcohols, etc., including those higher alcohols liquid at the temperature of operation of the process. Instead of using any one of the alcohols singly, mixed alcohols such as mixed amyl alcohols may be used. Mixtures of alcohols of different molecular weights can also be used. In general, it is preferred to utilize water-immiscible alcohols, i.e., $C_5$ and higher, since this facilitates the recovery of the alcohol in anhydrous form for reuse in the preparation of aluminum alcoholate. A hydrocarbon, such as a petroleum distillate boling within the range of 200°–500° F. or higher, preferably of narrow boiling range which includes the boiling range of the alcohol used, is added to the alcohol in preparing the aluminum alcoholate. Instead of using a hydrocarbon fraction, selected hydrocarbons such as heptane, octane, toluene, xylene, etc., may be used. The addition of the hydrocarbon is essential to the successful conduct of the process. The use of the hydrocarbon diluent has the following important effects in the process.

(1) The diluent aids in controlling the reaction of the alcohol and aluminum metal since a large amount of heat is liberated in the reaction and the hydrocarbon diluent aids in the dissipation of this heat;

(2) The hydrocarbon serves as a solvent for the solid aluminum alcoholate;

(3) The hydrocarbon diluent greatly aids in the separation and recovery of the alcohol from the slurry after hydrolysis; and (4) The solution of the aluminum alcoholate in the hydrocarbon diluent permits easy dispersion of the aluminum alcoholate in the hydrolyzing medium and facilitates the conversion of the hydrous alumina substantially completely to β alumina trihydrate.

The metallic aluminum in the form of chips, shot, turnings, ingots or the like is reacted with the alcohol in the presence of the hydrocarbon diluent and in the presence of a suitable catalyst such as mercuric chloride or other mercury salts, iodine, aluminum halides, or the like. The formation of the alcoholate takes place in accordance with the following equation:

*Equation 1*

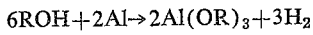

$$6ROH + 2Al \rightarrow 2Al(OR)_3 + 3H_2$$

The hydrogen is in the gaseous state and escapes from the reaction mixtures.

The aluminum alcoholate is then hydrolyzed with good vigorous agitation with from about 1 to 10 volumes of aqueous $NH_4OH$/volume of alcoholate, preferably 2-3 volumes per volume of alcoholate solution. The concentration of $NH_3$ in the hydrolyzing medium is preferably in the range of about 1.8 to 3.4 weight percent. Higher concentrations of ammonia in the hydrolyzing medium have a tendency to eliminate the larger pores in the adsorptive alumina formed. The temperature of hydrolysis is kept within a range of about 50 to 200° F., preferably between about 100 to 175° F. Lower concentrations of ammonia are preferably used if the hydrolysis temperature is in the lower portion of the aforesaid range. The crystalline hydrous alumina slurry is aged while contained in the water layer for a period of at least about an hour and up to 4 or 5 days. In general, the higher the hydrolysis temperature, the longer the aging period required. The aging is ordinarily carried out at temperatures in the range of 35°–80° F. preferably at 50–65° F. Thus an alumina formed at 150° F. needs about 3 hours' aging as against 1 hour for an alumina formed at 80° F. for conversion to β alumina trihydrate. In a preferred embodiment a solution of aluminum amylate is hydrolyzed by slow addition to a dilute ammonium hydroxide solution (3.0 wt. percent $NH_3$) at about 175° F. while agitating the same very vigorously, aging the hydrous alumina slurry for 3 or 4 days at about 60° F. to develop large crystal aggregates, dewatering, drying and calcining at about 1100° F. for four hours. The use of $NH_4OH$ is especially desirable where the alcoholate is added slowly to the water. In this case less aging is needed after addition to the last drop.

When using water-insoluble alcohols, the alcohol which is reformed or regenerated by the hydrolysis step together with the hydrocarbon diluent forms a layer separate and distinct from the slurry of hydrous aluminum oxide and is easily recovered and removed by a simple process of decanting or the like.

When using a water-soluble alcohol for reacting with aluminum to form the alcoholate, the alcohol reformed upon hydrolysis of the alcoholate goes into solution in the water and can be recovered by distillation. The recovered alcohol must then be dehydrated to anhydrous form in known manner before it is again used for reaction with additional metallic aluminum.

The alumina slurry after aging, in which the major proportion of the alumina is in the beta trihydrate form and in which the alumina hydrate crystals have formed sufficiently large aggregates or clusters, is then preferably first dried at a temperature in the range of 200°–400° F. or higher to remove the ammonia and aqueous medium in which it is contained and recover the alumina. Crystalline eta alumina is formed by further dehydrating the beta alumina trihydrate (Bayerite). It has been found that this conversion is essentially quantitative when the activating temperature is in the range of 400°–1400° F., preferably about 1100° F. The activation is generally in the presence of air, but can be done in vacuum or other inert gases. Because of the aforementioned transformation of beta trihydrate to eta alumina, this can also be used to indicate the amount of eta phase in the alumina made by activating the product of the hydrolysis.

This calcination or activation treatment can alternatively follow the addition of the catalyst component where the combined catalyst is heated in the same temperature range. This is explained in further detail below. In a similar manner the dehydrogenation agent or active catalytic component can be added to the base either before or after the latter is dried.

The eta alumina can be converted into a hydroforming catalyst by the addition of molybdenum oxide, vanadium oxide, tungsten oxide or chromium oxide, or metallic salts of molybdic acid such as calcium molybdate or cobalt molybdate or preferably precious metals such as platinum or palladium. The incorporation of the catalytic component can be effected in any of a variety of ways well known to the art. For example, molybdenum oxide can be incorporated by slurrying molybdenum oxide with the hydrous alumina or the latter can be dried and the molybdenum oxide sublimed thereon. Alternatively the molybdenum oxide can be incorporated by treating the alumina with ammonium molybdate. It is necessary, however, that the beta trihydrate or the eta form of alumina be formed before the ammonium molybdate or other dehydrogenation compounds are added.

The amount of catalytic component added can be varied, depending to a large degree upon the particular material used. For the most part the catalytic metal oxides or metallic salts of molybdic acid are applied in sufficient amount to give from about 5 to 20 weight percent of the said component in the final composite, although in the case of chromium oxide as much as 40 weight percent may be incorporated. In the case of the precious metal catalysts about 0.001 to 2.0 weight percent of platinum or about 0.5 to 5.0 weight percent of palladium will suffice to give a catalyst of the desired activity. The dehydrogenating or active catalytic component can be added to the base either before or after the latter is dried, as explained before. It is ordinarily preferred to subject the catalyst to a calcination treatment or heating to temperatures of up to about 1200° F. or higher prior to use in a reforming or hydroforming process. For platinum catalysts temperatures in the range of 800°–1100° F. are preferred.

Because of the marked superiority of eta alumina as a support for platinum catalysts, more detailed information is supplied on the preparation of these materials.

The platinum is impregnated on the alumina support by means known in the art. One of the better means involves treatment of the eta alumina support of this invention in the hydrous, dried or calcined form with aqueous solutions of water-soluable inorganic platinum-containing compounds. The term "water-soluble" also includes platinum-containing compounds which form colloidal solutions. Typical of the water-soluble inorganic platinum-containing compounds are chloro-platinic acid, potassium platinum chloride, platinum disulphide, tetrammino platino chloride, potassium platino-nitrite, dichloro diammino platinum, ammonium platino-nitrite, and dinitrito-diammino-platinum. A conveniently used aqueous platinum solution is one containing 15 grams of $H_2PtCl_6 \cdot xH_2O$ (40% Pt) per liter. This strength can be employed to yield catalysts containing about 0.5% platinum; lower or higher concentrations are employed when it is desired to alter the platinum content of the final catalyst. The gross amount of solution utilized is preferably that required to impregnate with the desired amount of platinum by just wetting the total alumina. The alumina support in the platinum solution is heated to dryness, conveniently at temperatures of about 100°–600° F. at atmospheric pressure, which results in removal of a substantial portion of the water.

The final step in the preparation involves the subjection of the dried catalyst to a reduction step. This reducing step can be carried out by means known in the art, such as hydrogenation and treatment with chemical reducing agents. Typical of these reduction operations is treatment with hydrogen at 200°–1000° F. with hydrogenation pressures of atmospheric to 1000 p.s.i.g. The catalyst can be calcined after the drying step. Calcining can be carried out at temperatures of the order of about 1100° F., e.g., 800°–1250° F. Both types of operations are preferably carried out slowly, for example, over the course of about 4 to 24 hours.

It has also been found desirable to treat the catalyst, either before (in the $NH_3$-free hydrous, dry or calcined form), after, or during impregnation of the active catalytic component, with an aqueous dilute combined acid solution, i.e., an oxidizing acid such as $HNO_3$, perchloric acid, or hypochlorous acid, together with a hydrogen halide such as HCl, HF, HI and HBr. $HNO_3$ and HCl are preferred. It has been found that 0.1 to 8 weight percent nitric acid based on the total catalyst and 50–500 weight percent water is suitable. It is preferred to employ a dilute solution which is about 0.01 molal to 2.5 molal $HNO_3$.

The HCl is employed in an amount of about 1 to 30 weight percent based on the catalyst. This acid is contained in from 50 to 500 weight percent water based on the supported catalyst. These concentrations of acid do not dissolve the support appreciably. It is preferred to use solutions which are from 0.1 molal to about 3 molal HCl.

In acid treating, the calcined catalyst is contacted with the acid, then the acid is drained off and the catalyst is washed thoroughly with distilled water, and then it is dried at 250° F. and recalcined for 1–4 hours at 1100° F. in the case of Pt catalysts.

It is also advantageous to treat the fresh catalyst with gaseous halogen, e.g., chlorine, in an amount of from 0.1 to 10 weight percent on catalyst and preferably 1 to 3 weight percent.

This invention will be better understood by reference to the following examples of the preparation and the advantages of the catalyst of this invention.

EXAMPLE I

Aliquot samples of aluminum amylate solution prepared essentially as described in Example IV of U.S. Patent 2,636,865 were hydrolyzed at various temperatures utilizing equal volumes of water or aqueous ammonia, as indicated. The time of aging was also varied to ascertain the effect of these three variables. The results are presented in the table below.

*Effect of $NH_4OH$ and low-temperature aging hydrolysis of aluminum amylate*

| Temp., ° F., of Hydrolysis | Concentration, $NH_3$, percent | Hours Aging at Room Temperature | Wt. Percent Trihydrate in 250° F. Dried Alumina |
|---|---|---|---|
| 35 | None | 0.5 | 5 |
|  |  | 1 | 45 |
|  |  | 15 | 75 |
|  |  | 40 | 100 |
|  | 2.4 | 0.5 | 84 |
| 80 | None | 40 | 78 |
|  | 2.4 | 0.5 | 90 |
|  | 2.4 | 4 | 100 |
|  | 2.7 | 40 | 100 |
| 135 | 2.7 | 2 | 70 |
|  | None | 40 | 28 |
| 150 | 2.4 | [1] 0.5 | 70 |
|  | 2.7 | 40 | 65 |

[1] After rapid cooling (less than ½ hour) to room temperature.

These results demonstrate that the higher the temperature of hydrolysis the longer the aging time required. They also show the clear cut improvement obtained through the utilization of aqueous solutions of ammonium hydroxide as the hydrolyzing medium. For example, a ½ hour aging with 2.4% ammonia at 80° F. gave results superior to those obtained with 40 hours of aging in the absence of $NH_4OH$. These figures also demonstrate how 100% eta alumina can be obtained utilizing $NH_4OH$ in less than four hours as contrasted to the aging time of 40 hours required to obtain the same eta alumina concentration in its absence. The beta trihydrate is converted to the eta alumina by heating for 4 hours at 1100°F.

As pointed out before, conversion of beta trihydrate to the eta form is quantitative, and the eta figures can be postulated on the beta trihydrate content of the hydrolyzate.

EXAMPLE II

Aliquot samples of the solution of aluminum amylate used in Example I were hydrolyzed at 35° F. and aged for ½ hour. The controlled variable was the concentration of ammonia in the aqueous hydrolyzing medium. The results are presented below.

*Effect of $NH_3$ concentration*

| Temp., ° F., of Hydrolysis | 35 | 35 | 35 | 35 |
|---|---|---|---|---|
| Hrs. Aging at Room Temp. | 0.5 | 0.5 | 0.5 | 0.5 |
| Percent $NH_3$ | 0 | 1.3 | 2.4 | 4.4 |
| Percent Trihydrate in 250° F. Dried Alumina | 5 | 61 | 84 | 75 |

These figures demonstrate conclusively the effect of ammonium hydroxide in producing the desired eta alumina.

EXAMPLE III

Aliquot samples of the solution of aluminum amylate used in Example I were hydrolyzed with ammonium hydroxide for ½ hour and aged for ½ hour, with the hydrolysis temperature varied. The results are presented in the table below.

*Effect of temperature of hydrolysis*

| Percent $NH_3$ | 2.4 | 2.4 | 2.4 |
|---|---|---|---|
| Hours aging at room temperature | 0.5 | 0.5 | 0.5 |
| Hydrolysis temperature, ° F. | 35 | 80 | 150 |
| Percent Trihydrate in 250° F. dried alumina | 84 | 90 | 70 |

These figures demonstrate the undesirability of exceeding by much a temperature in the range of 70°–100° F. when long aging is to be avoided.

EXAMPLE IV

Catalysts were prepared containing 0.6 weight percent platinum on alumina containing varying amounts of eta alumina (the remainder gamma). These catalysts were used in the hydroforming of a coastal virgin naphtha feed of 50 octane number boiling in the range of 200°–330° F. The conditions were 200 p.s.i.g., 900° F., 6/1 hydrogen/hydrocarbon ratio and 4 wt./hr./wt. The results of the hydroforming, as well as the subjecting of these catalysts to the deleterious effect of heat aging, are shown in the graph in the drawing.

It can be seen from the figure that catalyst made with eta alumina has an activity indicated by 100+ octane number, whereas the gamma alumina leads to an activity of only 94.5 octane number. The stability against deactivation by aging (i.e., crystal growth of platinum through prolonged use and repeated regenerations) is indicated in the lower curve. These catalysts were given an accelerated aging test by heating at 1250° F. for 64 hours in air. This treatment is estimated to be much more severe than that encountered in a year of regenerative operation. It can be seen that the catalyst with the eta alumina base is decidedly superior to that with the gamma alumina base—98 O.N. v. 89 O.N. Furthermore, it can be noted that upon heat aging, the catalyst made with eta alumina decreases only two octane numbers, whereas the catalyst made with gamma alumina decreases about 6 octane numbers.

EXAMPLE V

Two aliquot samples of aluminum amylate solution prepared as described in Example IV of U.S. Patent 2,636,865 were hydrolyzed, one with water and the other with an equal amount of water containing 2.4% $NH_3$. Each of the 250° F. dried alumina hydrate products obtained after stripping and drying was contacted with a solution containing 7 weight percent HCl, 4 weight percent $HNO_3$, and 200 weight percent $H_2O$ on a steam bath (150° F.) for one hour. The excess solution was then drained off and the product calcined for 4 hours at 1100° F. The calcined material was washed thoroughly with distilled water, dried at 250° F., and calcined for one hour at 1100° F. This was followed by impregnation with a water solution of chloroplatinic acid, 1.5 grams $H_2PtCl_6 + nH_2O$ (containing 40% Pt) per 100 grams of base. The impregnated base was dried at room temperature 24 hours, at 250° F. 16 hours, and calcined one hour at 1100° F. to yield the finished catalyst containing 0.6% Pt. These catalysts were then used in the hydroforming of the same feeds as used in Example IV. The results are presented below.

*Hydroforming data on catalysts with acid-treated bases*

| Temperature of Hydrolysis | 80 | 80 | 80 |
|---|---|---|---|
| Percent $NH_3$ | None | | 2.4 |
| Percent Trihydrate | 75 | | 90 |
| Acid Treated Base | Yes | Yes | Yes |
| Res. O.N. of $C_5$ + Gasoline | 94.5 | | 96 |

These figures demonstrate the improvement obtained even on acid-treated bases where the hydrolysis was conducted with ammonium hydroxide.

EXAMPLE VI

An experiment was conducted in the same manner as Example V above, except that the acid treatment was utilized on the finished catalyst rather than the base. The octane number of the catalyst prepared from the ammonium hydroxide hydrolyzed base was 98 as contrasted with an octane number of 96 for the control. This illustrates the advantage of the treatment of this invention.

EXAMPLE VII

Two alumina samples were prepared as in Example V. The aluminas were pelleted after drying at 250° F. and then calcined at 1100° F. in air for 4 hours. No acid treatment was applied. The alumina prepared without ammonia was impregnated with an ammoniacal solution of chloroplatinic acid. The alumina prepared by ammonia hydrolysis was impregnated with aqueous chloroplatinic acid. The two catalysts were used to hydroform a virgin naphtha having a research octane number of 52 at 900° F. at 200 p.s.i.g. and 6/1 $H_2$/HC mole ratio. As a control there was used a catalyst made from alumina without using ammonia in any step.

| Temperature of Hydrolysis, ° F | 70–100 | 70–100 | 70–100 |
|---|---|---|---|
| $NH_4OH$ During Hydrolysis | No | No | Yes |
| $NH_4OH$ During Impregnation | No | Yes | No |
| $C_5$+Gasoline, Res. O.N. | 99 | 95 | 102 |

These data again show the advantage for hydrolyzing the aluminum alcoholate in the presence of ammonia. They also show the need for using the ammonia during the hydrolysis step in the manufacture of the alumina. Use of ammonia during the impregnation is not satisfactory and gives a loss in activity.

EXAMPLE VIII 8 liters of commercial concentrated ammonium hydroxide solution (28% $NH_3$) were cooled in an isopropyl alcohol-dry ice bath to minus 25° F. 6 liters of aluminum amylate solution were introduced under the surface with nitrogen agitation. Addition of the alcoholate took place over 1½ hours. The hydrolysis mixture was allowed to warm to room temperature overnight in the bath. The hydrous alumina slurry was aged 10 days. At the end of this time the alumina was stripped free of the solvent. Then it was dried at 250° F. and finally calcined 4 hours at 1100° F. This alumina is designated below as Sample A.

Another sample of alumina (designated as Sample B) was prepared in concentrated ammonium hydroxide with the hydrolyzing medium maintained at 32–45° F. in a wet ice bath with aging of the hydrolyzate for 6 days after which the alumina was stripped, dried and calcined as in the case of Sample A.

Another sample of alumina designated as Sample C was prepared by hydrolyzing aluminum amylate solution in a dilute ammonium hydroxide solution (2.8% $NH_3$) at 70–80° F. aging for one hour after which the alumina was stripped, dried and calcined as in the case of Sample A.

Another sample of alumina designated as Sample D was prepared by hydrolyzing aluminum amylate in water at 32–40° F. following which the hydrolyzate was aged for 5 days at ambient temperatures. The alumina hydrate was then stripped, dried and calcined as in the case of Sample A.

The inspections on each of these samples of alumina were as follows:

| Alumina | Surface Area, m.²/gm. | Pore Vol., cc./gm. | Pore Dia., A. |
|---|---|---|---|
| Sample A | 196 | 0.27 | 54 |
| Sample B | 185 | 0.25 | 54 |
| Sample C | 210 | 0.27 | 52 |
| Sample D (Ave. of two) | 231 | 0.33 | 61 |

While these values, particularly of pore volume and pore diameter are quite comparable, the nitrogen adsorption isotherms for Samples C and D showed large pore hysteresis while the isotherms for Samples A and B were devoid of large pore hysteresis. This indicates that the Samples A and B have a narrow pore size range distributed closely around the average while the Samples C and D have a much wider pore size range with a substantial portion of their pore volume in pores larger than 100 A. Since Samples B and D were prepared at substantially the same temperature it is clear that the loss in larger diameter pores found in Sample B must be attributed to the high ammonia concentration in the hydrolyzing medium.

Each of these alumina samples was impregnated with 0.6 wt. % platinum by treatment with chloroplatinic acid solution, dried, pelleted into 3/16" x 3/32" pills and calcined 1 hour at 1100° F. The several catalysts were then tested under standard conditions in an isothermal unit. Catalysts prepared from alumina Samples C and D gave a relative activity of 100 while the catalysts prepared from alumina Samples A and B each gave a relative activity of 88.

EXAMPLE IX

To 28 liters of distilled water at 150° F., 2.8 liters of concentrated ammonium hydroxide solution was added to give a solution containing 2.8% $NH_3$. To this solution 4 liters of aluminum amylate solution was added slowly with vigorous stirring. At a completion of the addition of the aluminum amylate the hydrolyzate was stirred an additional hour. The sample was then placed in a large flask and aged at ambient temperature for 40 hours. pH reading was 10.5. Actual initial temperature of the ammonium hydroxide solution was 166° F. and final temperature of the hydrolyzate was 145° F. This alumina was stripped, dried for 16 hours at 250° F. and calcined 4 hours at 1100° F. This alumina is designated below as Sample E.

To the 263 grams of the resultant alumina was added 157.8 cc. of a solution made by dissolving 3.95 grams of chloroplatinic acid in distilled water. The impregnated powder was mixed well and left to dry at room temperature for 16 hours. Oven dried at 250° F. for 16 hours. It was pelleted and then calcined 1 hour at 1100° F.

Another sample of alumina designated as Sample F was prepared by hydrolysis in water at the same temperature as Sample E and two additional samples, designated as Samples G and H were prepared with the same ammonium hydroxide concentrations at different temperatures and for different aging times. The several aluminas were separated, dried and calcined under the same conditions as in the preparation of Sample E and then each sample of alumina was formed into a platinum catalyst of the same platinum content and in the same way as in the case of Sample E. The several samples of catalyst were then tested under standard conditions in an isothermal unit. The inspections of the several aluminas and the activity of the catalysts prepared therefrom are summarized in the following table.

TABLE

| Alumina Sample | Hydrolysis Cond. | | Aging Time Hrs.[a] | Percent Beta Trihydrate | Rel. Act. of Cat.[b] | Total Pore Vol., cc./gm. | Percent Pore Vol. in Macropores[c] |
|---|---|---|---|---|---|---|---|
| | Med. | Temp., °F. | | | | | |
| E | 2.8% NH₃ | 150 | 40 | 65 | 150 | 0.785 | 60 |
| F | Water | 150 | 40 | 30 | 70 | 0.415 | 20 |
| G | 2.8% NH₃ | 80 | 40 | 100 | 100 | 0.755 | 50 |
| H | 2.8% NH₃ | 135 | 2 | 70 | 90 | 0.700 | 46 |

[a] Aging temperature not controlled; started at hydrolysis temp. and cooled down to ambient temperature.
[b] 0.6% Pt on 3/16″ × 1/4″ pills; 0.6% Cl; 16 w./hr./w. at 900° F.
[c] Pores between 0.05 and 1 micron diameter.

It may be seen from the foregoing data that a catalyst of outstanding activity was obtained from the alumina (Sample E) prepared by high temperature hydrolysis in dilute ammonia followed by long time aging at ambient temperature. It would appear that the high temperature hydrolysis with vigorous agitation promotes the formation of small crystallites while the long-time aging at ambient temperature allows slow crystal growth leading to larger aggregates which lead in turn to the development of macropores.

A striking difference may be seen by comparing Sample E with Sample G of the above table, the former showing a 50% increase in activity even though the eta alumina content (previously considered the principal criteria for catalyst activity) was considerably lower. The importance of the low temperature aging after high temperature dilute ammonia hydrolysis is demonstrated by comparing Sample E and Sample H. 60% of relative activity is lost by reducing the aging period from 40 hours to 2 hours. This latter effect is also connected with the aging temperature, since during the short aging period of 2 hours, the hydrolyzate cooled from the starting temperature of about 135° F. and hence was at a substantially higher average temperature than the alumina which was aged for 40 hours.

The catalysts of this invention are adapted for use in hydroforming, hydrogenation, hydrocracking, cracking, oxidation, and other reactions known to those in the art. These catalysts are especially useful for the production of aromatics from naphthenes and for the cyclization-dehydrogenation of paraffins and olefins.

The specific names of the crystal modifications of alumina and the alumina hydrates now commonly accepted in the literature and used here are described in detail in an article by H. C. Stumpf et al. of the Aluminum Company of America, in Industrial and Engineering Chemistry, volume 42, page 1398, July, 1950.

The method of this invention is applicable to the preparation of pilled, powered, extruded, etc., catalysts. Although ammonia hydrolysis is the preferred modification of this invention, organic bases such as amines, piperidines, as well as hydrazines, can be used to advantage in some cases.

This application is a continuation-in-part of our application Serial No. 402,473, filed January 6, 1954, now abandoned.

It is to be understood that this invention is not limited by theory or the specific examples, which have been offered merely as illustrations, and that modifications may be made without departing from the spirit of the invention.

What is claimed is:

1. The method of preparing alumina especially adapted for use as a catalyst support which comprises preparing a solution of an aluminum alcoholate in a liquid hydrocarbon solvent, slowly adding said solution of aluminum alcoholate to an aqueous solution of ammonia containing about 1.8 to 3.4 wt. percent $NH_3$ while vigorously stirring said aqueous solution, the amount of aqueous ammonia utilized being in the range of about 1 to 10 volumes per volume of alcoholate and the temperature of said aqueous ammonia being in the range of 50 to 200° F., aging the hydrous alumina slurry in the resultant aqueous layer at a temperature below about 80° F. for periods of from one hour to five days to convert the hydrous alumina to beta alumina trihydrate, said aging time being near one hour when hydrolysis is effected at temperatures in the lower part of the temperature range and the aging time being about four to five days when hydrolysis is effected at temperatures in the upper part of said range, separating the hydrous alumina from the excess water and drying to remove the ammonia and aqueous medium, and thereafter heating the hydrous alumina to a temperature in the range of 400–1400° F. to dehydrate it to an adsorptive alumina which is predominantly in the eta phase and which contains more than 40% of its total pore volume in macropores or pores with diameters between 0.05 and 1.0 microns.

2. The process as defined in claim 1 in which the aluminum alcoholate is derived from a $C_5$ and higher alcohol.

3. The method of preparing alumina especially adapted for use as a catalyst support which comprises preparing a solution of aluminum amylate in a liquid hydrocarbon solvent, slowly adding said solution of aluminum amylate to an aqueous solution of ammonia containing about 1.8 to 3.4 wt. percent $NH_3$ while vigorously stirring said aqueous solution, the amount of said aqueous ammonia utilized being in the range of about 1 to 10 volumes per volume of aluminum amylate and the temperature of said aqueous ammonia being about 135–175° F., aging the hydrous alumina slurry in the resultant aqueous layer for about 1 to 5 days at temperatures of 55–75° F. thereby converting the hydrous alumina into large crystal aggregates of beta alumina trihydrate, separating the hydrous alumina from the excess water and drying it to remove the ammonia and aqueous medium and thereafter heating the hydrous alumina to a temperature of from 1000–1400° F. to dehydrate it to an adsorptive alumina which is predominantly in the eta phase and which contains more than 40% of its total pore volume in macropores or pores with diameters between 0.05 and 1.0 microns.

4. The process defined in claim 3 in which the calcination of the hydrous alumina is carried out for 4 hours at 1100° F.

References Cited in the file of this patent

UNITED STATES PATENTS

| | | |
|---|---|---|
| 2,636,865 | Kimberlin | Apr. 28, 1953 |
| 2,796,326 | Kimberlin | June 18, 1957 |

FOREIGN PATENTS

| | | |
|---|---|---|
| 667,145 | Great Britain | Feb. 27, 1952 |